Figure 1:
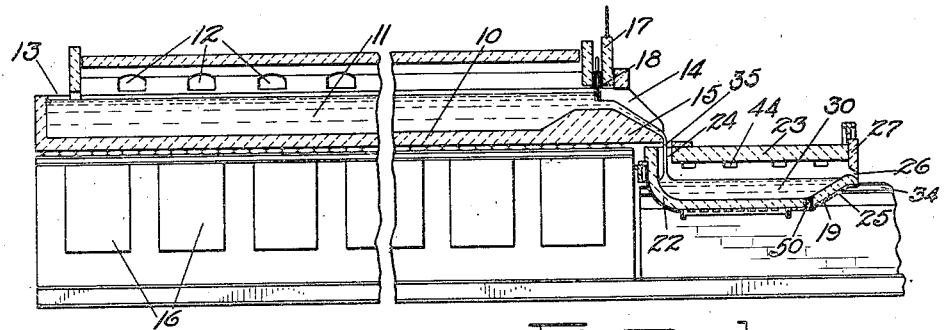

Aug. 11, 1931.  E. T. FERNGREN  1,818,217
METHOD AND APPARATUS FOR FLOWING SHEET GLASS
Filed Jan. 19, 1925  2 Sheets-Sheet 1

INVENTOR.
Enoch T. Ferngren.
Frank Fraser
ATTORNEY.

Aug. 11, 1931.  E. T. FERNGREN  1,818,217
METHOD AND APPARATUS FOR FLOWING SHEET GLASS
Filed Jan. 19, 1925  2 Sheets-Sheet 2
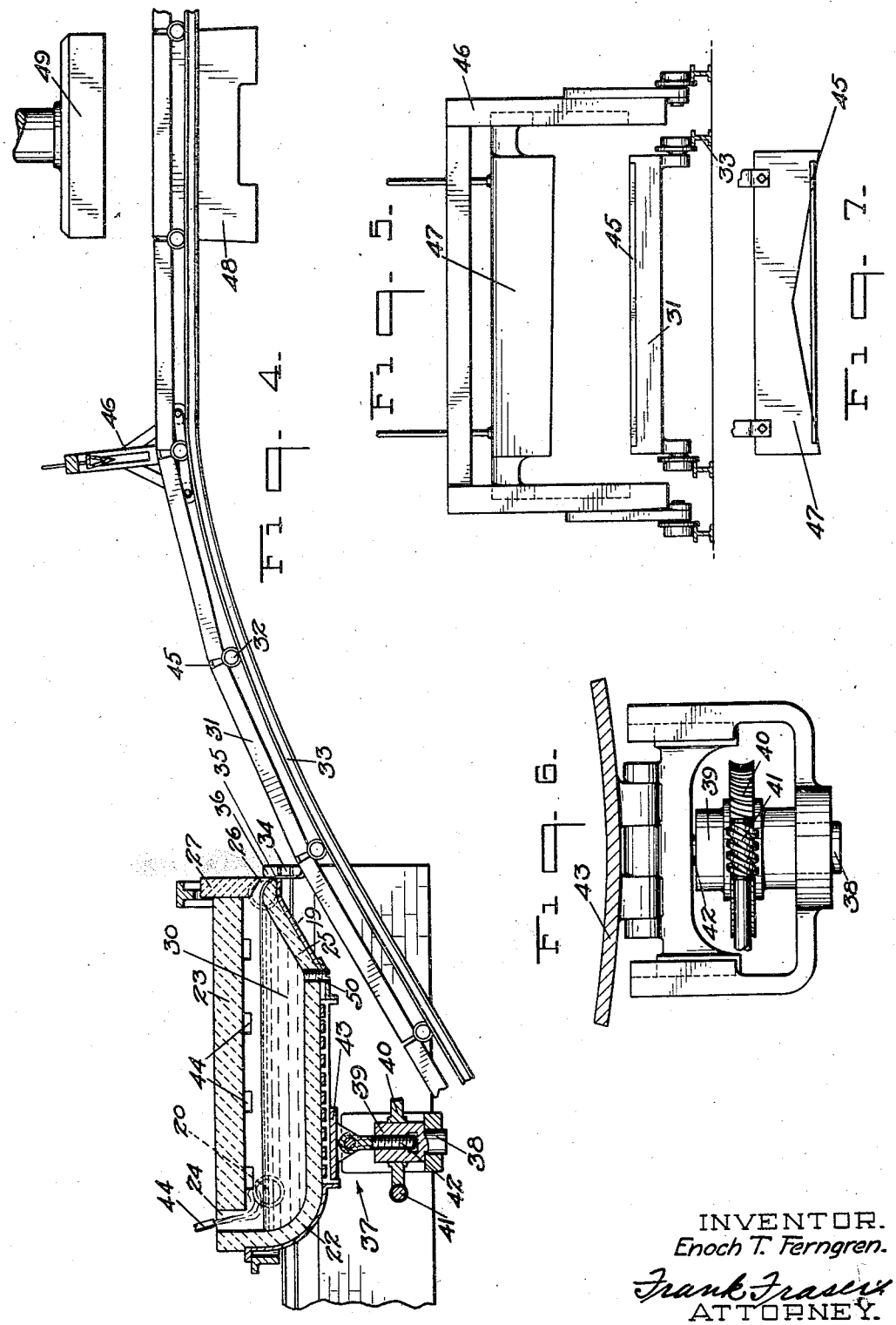
INVENTOR.
Enoch T. Ferngren.
Frank Fraser
ATTORNEY.

Patented Aug. 11, 1931

1,818,217

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR FLOWING SHEET GLASS

Application filed January 19, 1925. Serial No. 3,260.

The present invention relates to sheet glass apparatus, and has particular reference to a method and apparatus for producing blanks especially well-adapted for use as plate glass blanks.

An important object of the invention is to provide a method and apparatus for producing sheet glass and plate glass blanks wherein a source of molten glass is flowed into a movable pot which is adapted to be tilted to flow a sheet-like stream formation of glass upon a plurality of molds.

A further object of the invention is to provide a method and apparatus for producing sheet glass wherein a source of molten glass is flowed into a tiltable pot which is mounted upon a truck adapted to run on a suitable tracking mechanism whereby the pot can be filled with molten glass and moved to a position where it can be tilted for flowing a stream of glass upon a plurality of movable mold tables.

A further object of the invention is to provide means for filling a tiltable pot with a mass of molten glass whereby the pot may be tilted to flow a stream of glass upon movable mold sections after which the sheet formed is severed between adjacent mold sections and then pressed to a flat and uniform sheet.

It is essential that the molten glass used for the blanks for plate glass be of uniform composition, like consistency, and physical properties, and of approximately uniform temperature immediately prior to the forming of the blanks.

The present invention aims to accomplish these essentials, and with this in view it is an object that the quantity of molten glass which is to be used up in the making of a series of blanks be first produced in, and then assembled at the discharge end of the melting tank, before any portion of such quantity is used or is caused to be advanced from the tank, in order that a uniform melt may be had without stream movement of glass from the tank to the point where the sheet is drawn, or otherwise formed.

It is also an object of this invention to provide a plurality of movable pots from which a wide and shallow stream of glass may be flowed, and to provide at least two separate melting tanks of the type herein shown for the successive charging of said pots with molten glass in order that the sheet forming operation be made practically continuous and the quantity of molten glass which forms the charge of each successive pot may have sufficient time to clarify and refine in the tank before being discharged into a pot. The provision of a number of pots also affords time for the proper attention to and handling of the glass received in each pot, and gives time for draining, cleaning and proper heating of each pot after the greater portion of its glass contents has been poured therefrom, so that nearly perfect operative conditions may be maintained inasfar as affecting the quality of the glass flowed from each pot upon the mold tables.

In the drawings wherein like numerals are employed to designate like parts throughout the same.

Figure 2:
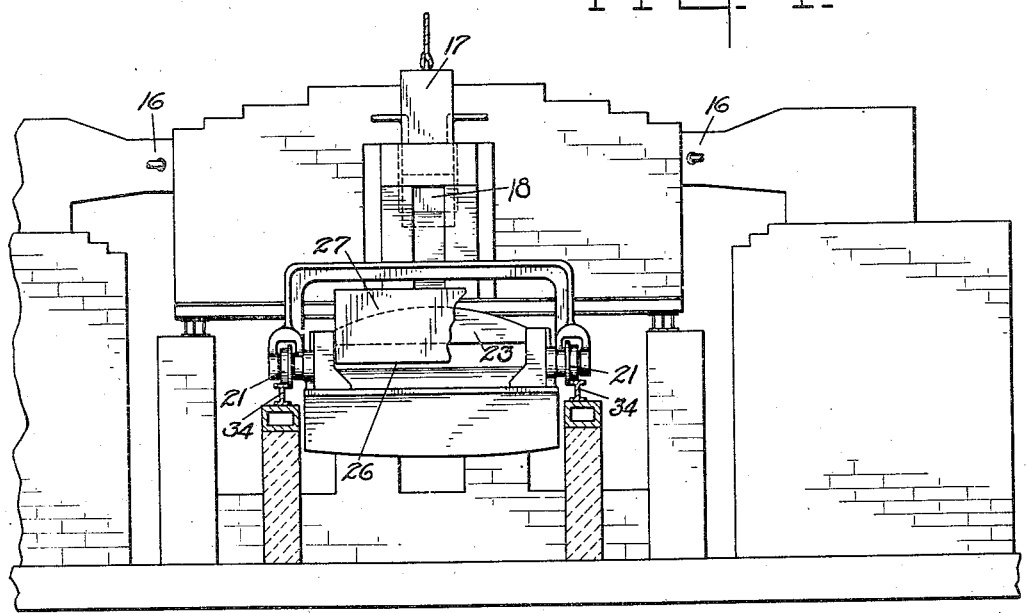
Figure 3:
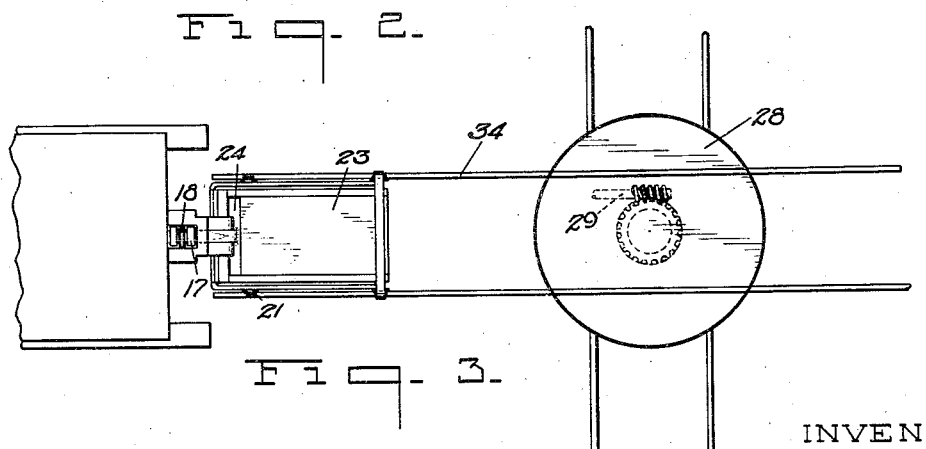

Fig. 1 is a vertical longitudinal section through a portion of the apparatus,

Fig. 2 is a front elevation showing the discharge opening of the tank furnace of Fig. 1, Fig. 3 is a top plan view of a portion of the apparatus indicating one form of tracking mechanism which may be used, Fig. 4 is a fragmentary view illustrating the movable pot in operative position for flowing a stream of glass upon mold sections, Fig. 5 is an elevation showing the glass cutting mechanism which may be employed, Fig. 6 illustrates one type of jack mechanism for tilting the pot, and Fig. 7 is a view of a modified cutting means.

The present invention is designed particularly for forming sheet glass which is especially well-adapted for use as plate glass blanks. Heretofore plate glass blanks have been formed by rolling a mass of molten glass upon a suitable table. Because of the uneven blank formed by this operation it has been necessary to form the blank substantially thicker than the desired thickness of the finished sheet produced from such blank. In the present invention, in view of the type of blank formed, it is possible to form the blank of substantially the same thickness as the thickness of the finished sheet, and furthermore the blank will be of such a nature that it will require but very little grinding and polishing to give the desired finished effect.

In Fig. 1 is shown a form of tank furnace which may be used, and comprises the furnace 10 which contains a source of molten glass 11 which is heated by means of the regenerators or the like 12. The glass batch or ingredients going to make up the glass 11 are introduced in the doghouse 13, and are acted upon by the regenerators or other form of heating means 12, and flow toward the discharge end 14. The tank 10 is of sufficient length to permit suitable refining and settling of the glass, and it is permitted to overflow the discharge lip 15. The discharge end 14 is controlled by a movable gate 17 and a supplementary gate valve 18 in the form of a water-cooled member.

The gate valve 18 is used during flow discharge of glass from the furnace, and said valve is raised or lowered to govern the quantity discharge over the lip 15.

The pot used in the present invention comprises a truck member 19 which is provided with the axles 20 upon which are journaled the wheels 21. Arranged within the truck 19 is a refractory pot 22 having the cover-tile 23 in which is formed an opening 24. The opening 24 is formed in the intake end of the pot 22, while the opposite end is provided with the discharge lip 25 and opening 26. An adjustable gate 27 is also provided to control the opening 26.

The glass 11 is flowed from the tank 10 over the discharge lip 15 through the opening 24, and into the pot 22. The cover-tile 23 will assist in maintaining the glass at a high temperature, and if it is desired it may be reheated after it has been poured into said pot. A tracking mechanism, which is normally shown in Fig. 3 is provided to facilitate in moving the truck and pot to and from the tank 10. A turn table arrangement 28, operable by the means 29, may be provided to deflect the truck and pot from one direction to another.

The glass 30 within the pot is adapted to be flowed upon the mold sections 31 which are provided with wheels or casters 32 operable upon the track 33. The mold sections may be of any desired size depending upon the size sheet which is to be formed, and are so arranged that they may be continuously passed in an endless belt formation before the discharge lip 25 of the draw-pot. As is shown, the pot 22 is, after it has filled to the desired level from the tank furnace 10, moved along the track system 34 to a point where the said truck may be tilted to flow the glass in a stream-like formation 35 upon the molds 31 as they are moved below the said lip. The foremost wheels of the truck are adapted to engage a stop 36 in a manner that a jack mechanism designated in its entirety 37, may be employed to tilt the pot. The jack preferably comprises a stationary support 38 upon which is mounted a rotatable block 39 having connection with a gear 40 meshing with the drive worm 41. The block 39 is provided with an internal bore in which is received the screw-threaded shaft 42 pivotally connected to the saddle 43 which is brought to bear against the bottom of the truck as clearly illustrated in Fig. 4. Upon rotation of the gear 40 and block 39 the shaft 42 will be raised, thus raising the rear end of the pot to create a continuous flow of glass from the pot upon said molds. The speed of the molds and the speed of the tilting of the pot will be determined by the thickness of the sheet desired. To prevent a noticeable change or different states of fluency of the glass 30 within the pot, heating means 44 may be employed as illustrated.

The ribbon or sheet 45 is preferably separated between the adjacent mold sections 31, and to accomplish this a frame 46 may straddle the mold sections and have guide-ways for controlling the movement of a cutting or shearing member 47. The member 47 is adapted to be moved downwardly to sever the sheet 45 between the adjacent mold sections as illustrated in Fig. 4.

After the sheet has been separated it is moved over a pressing block 48 to support the mold while a suitable plunger 49 is moved downwardly to flatten the sheet and press it to a uniform thickness. The molds 31 and plunger 49 are all preferably formed from a suitable non-corrosive alloy, thus making it possible to produce a sheet of glass which is relatively smooth and free from surface defects. By using this type of mold, and by exercising sufficient care, it is possible to form sheets suitable for window glass use, while in other cases excellent blanks are produced for use in plate glass manufacture which require but very little surfacing to give sheets of the necessary finish.

Fig. 7 discloses a form of knife which may be used. The blade is so shaped that the sheet is cut from both sides toward the center. A plug 50 is provided in the pot to permit boiling out or draining thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a tank furnace containing a mass of molten glass, a pot, means for controlling a flow of glass from the furnace into said pot, means for moving the pot in a definite horizontal path away from the furnace, means for keeping the glass in said pot at the proper temperature, a plurality of molds hingedly associated and movable past said pot, means for tilting said pot for flowing a ribbon of glass therefrom upon the molds as they are moved past said pot, a plunger for pressing all of the glass in each mold simultaneously, and a cutter blade arranged transversely of the molds and adapted to be moved into contact with said ribbon of glass for severing the same between adjacent mold sections, said cutter being shaped in a manner to cut the sheet from both edges toward the center.

2. The combination with a furnace containing molten glass, and a plurality of molds associated in an endless belt formation, of a track arrangement, a pot mounted upon the tracks for receiving molten glass from the furnace and conveying it in a definite horizontal path a substantial distance away therefrom to said molds, means for tilting the pot to cause the molten glass therein to flow upon said molds, a flat presser means for reducing the glass in each mold to a flat sheet of uniform and predetermined thicknesses, a vertically movable cutter for severing the glass between the molds, said cutter being shaped in a manner to cut the sheet from both edges toward the center.

3. The combination with a furnace containing molten glass, of a plurality of molds associated in an endless belt formation, the molds passing through an inclined path at one time of their travel, a track arrangement, a pot mounted upon the tracks for receiving molten glass from the furnace and conveying it therefrom in a definite horizontal path to the molds, means for tilting the pot to cause the molten glass therein to flow upon said molds while they are being passed through an inclined path, means for reducing the glass in each mold to a flat sheet of substantially uniform and predetermined thickness, and means for severing the glass between the molds.

4. In combination, a furnace containing molten glass, a track arrangement, a pot mounted upon the tracks for receiving molten glass from the furnace and conveying it in a definite horizontal path to a point remote therefrom, a plurality of molds associated therefrom, a plurality of molds associated in an endless belt formation and movable past the pot, when it is arranged in a discharging position, in an inclined path, means for tilting the pot when in a discharging position to cause the molten glass therein to flow upon the molds as they move thereunder, means for reducing the glass in each mold to a flat sheet of substantially uniform and predetermined thickness, and a vertically movable cutter for severing the glass between the molds.

5. In combination, a tank furnace containing a mass of molten glass and having an outlet at one end thereof, a pot mounted in advance of the furnace and positioned beneath said outlet for receiving the molten glass therefrom, wheels carried by said pot, rails upon which said wheels are supported, said rails extending forwardly from the furnace and adapted to convey the pot in a definite horizontal path to a point remote therefrom, a plurality of molds associated in endless belt formation and positioned at a point remote from the furnace, said pot being movable along the rails out of cooperative relation with respect to the furnace and into cooperative relation with respect to the molds, lifting mechanism located beneath the rails and adapted to be positioned beneath the pot when said pot is moved into cooperative relation with respect to the molds, said lifting mechanism comprising a stationary support, a block rotatably mounted upon said support, a vertical screw threaded shaft carried by said block and projecting upwardly therebeyond, a saddle pivotally connected to the upper end of said shaft, and means for rotating said block to cause the saddle to bear against the bottom of the pot and effect a tilting thereof whereupon the molten glass will flow therefrom into the molds, a member engaging the forward end of the pot to prevent horizontal movement thereof along the rails during tilting, and means for pressing the glass within the molds to sheet form.

6. In combination, a tank furnace containing a mass of molten glass and having an outlet at one end thereof, a pot mounted in advance of the furnace and positioned beneath said outlet for receiving the molten glass therefrom, wheels carried by said pot, rails upon which said wheels are supported, said rails extending forwardly from the furnace and adapted to convey the pot in a definite horizontal path to a point remote therefrom, a plurality of molds associated in endless belt formation and positioned at a point remote from the furnace, said pot being movable along the rails out of cooperative relation with respect to the furnace and into cooperative relation with respect to the molds, lifting mechanism located beneath the rails and adapted to be positioned beneath the pot when said pot is moved into cooperative relation with respect to the molds, said lifting mechanism comprising a stationary support, a block rotatably mounted upon said support, a vertical screw threaded shaft carried by said block and projecting upwardly therebeyond, a saddle pivotally connected to the upper end of said shaft, means for rotating said block to cause the saddle to bear against the bottom of the pot and effect a tilting thereof whereupon the molten glass will flow therefrom into the molds, a member engaging the forward end of the pot to prevent horizontal movement thereof along the rails during tilting, means for pressing the glass within the molds to sheet form, and means for severing the glass between the molds including a horizontally movable frame straddling the mold sections, said frame being provided with vertical guide-ways, and a cutter carried by the frame and vertically movable in said guideways.

Signed at Toledo, in the county of Lucas, and State of Ohio, this 15th day of January, 1925.

ENOCH T. FERNGREN.